United States Patent
Krüger et al.

(10) Patent No.: US 9,682,873 B2
(45) Date of Patent: Jun. 20, 2017

(54) UV LAMP MODULE WITH EXCHANGEABLE LAMP UNITS

(71) Applicant: XYLEM IP HOLDINGS LLC, Rye Brook, NY (US)

(72) Inventors: Friedhelm Krüger, Lemgo (DE); Heike Beckmann, Bielefeld (DE)

(73) Assignee: Xylem IP Holdings LLC, Rye Brook, NY (US)

( * ) Notice: Subject to any disclaimer, the term of this patent is extended or adjusted under 35 U.S.C. 154(b) by 0 days.

(21) Appl. No.: 14/785,040

(22) PCT Filed: Apr. 4, 2014

(86) PCT No.: PCT/IB2014/060432
§ 371 (c)(1),
(2) Date: Oct. 16, 2015

(87) PCT Pub. No.: WO2014/170788
PCT Pub. Date: Oct. 23, 2014

(65) Prior Publication Data
US 2016/0052801 A1    Feb. 25, 2016

(30) Foreign Application Priority Data

Apr. 18, 2013   (DE) .................. 10 2013 006 635

(51) Int. Cl.
*C02F 1/32*       (2006.01)

(52) U.S. Cl.
CPC ........ *C02F 1/325* (2013.01); *C02F 2201/004* (2013.01); *C02F 2201/3225* (2013.01); *C02F 2201/3227* (2013.01); *C02F 2303/14* (2013.01)

(58) Field of Classification Search
USPC ................................ 250/493.1, 494.1, 496.1
See application file for complete search history.

(56) References Cited

U.S. PATENT DOCUMENTS

| | | |
|---|---|---|
| 4,367,410 A | 1/1983 | Wood |
| 5,332,388 A | 7/1994 | Schuerch |
| 5,660,719 A | 8/1997 | Kurtz |

(Continued)

FOREIGN PATENT DOCUMENTS

| | | |
|---|---|---|
| DE | 19957073 | 5/2001 |
| EP | 1661862 | 5/2006 |

(Continued)

OTHER PUBLICATIONS

International Search Report for International Application No. PCT/IB2014/060432 mailed Jul. 1, 2014.

(Continued)

*Primary Examiner* — Nicole Ippolito
*Assistant Examiner* — Hanway Chang
(74) *Attorney, Agent, or Firm* — RatnerPrestia

(57) ABSTRACT

A UV lamp module having a frame and at least two lamp units, wherein each lamp unit includes a UV lamp extending in an axial direction, a jacket tube enclosing the UV lamp, electrical connections and a head section for fastening the lamp unit to the frame, wherein for each lamp unit, a fastening device is provided by which the lamp unit can be separably connected to the frame in the region of the head section.

16 Claims, 10 Drawing Sheets

(56) References Cited

U.S. PATENT DOCUMENTS 6,039,460 A * 3/2000 Ng .................. B01J 19/123
362/101
7,648,684 B2 1/2010 Neitemeier

FOREIGN PATENT DOCUMENTS

| WO | 9846933 | 10/1998 |
|----|---------|---------|
| WO | 2012045148 | 4/2012 |

OTHER PUBLICATIONS

Written Opinion of the International Searching Authority for International Application No. PCT/IB2014/060432 mailed Jul. 1, 2014.

* cited by examiner

UV LAMP MODULE WITH EXCHANGEABLE LAMP UNITS

CROSS-REFERENCE TO RELATED APPLICATIONS

This patent application is a U.S. National Phase Patent Application of PCT Application No. PCT/IB2014/060432, filed Apr. 4, 2014, which claims priority to German Patent Application No. 102013006635.2, filed Apr. 18, 2013, each of which is incorporated by reference herein in its entirety.

FIELD OF THE INVENTION

The invention relates to a UV lamp module having a frame and at least two lamp units, wherein each lamp unit comprises a UV lamp extending in an axial direction, a jacket tube enclosing the UV lamp, electrical connections and a head section for fastening the lamp unit to the frame, wherein for each lamp unit, a fastening device is provided by means of which the lamp unit can be separably connected to the frame in the region of the head section.

BACKGROUND OF THE INVENTION

The germicidal-disinfectant effect of UV radiation has long been known. UV lamps have been used for many decades for the disinfection of drinking water and waste water, in air conditioning sumps and for disinfecting work areas in biological laboratories. When disinfecting water UV radiation is produced and released into the water, so that germs (viruses, bacteria, protozoa) are killed. Nearly all water disinfection systems can be operated with UV lamps, which are designed as gas discharge lamps with a mercury content in the gas filling. Mercury produces inter alia a dominant emission line at 254 nm, which is close to a maximum of the wavelength-dependent efficacy of UV light for the disinfection of microorganisms.

To protect against direct contact with water and the temperature insulation, the lamps are enclosed by jacket tubes. These jacket tubes and the lamps themselves are made of UV-transparent material, whereby usually quartz is used.

Two main types of lamps are used, namely what are known as low-pressure lamps, operating at a gas pressure of less than approximately 0.1 mbar and what are known as medium pressure lamps, the internal pressure of which is approximately 0.1-10 bar. Low-pressure lamps are characterised by a very high electrical efficiency, since about 40% of total electrical power consumed is converted into radiation power of the stated wavelength.

Since the absolute radiation power in relation to their size is relatively small, a large number of low-pressure lamps are used in a disinfection system with a large throughput of water. At the same time the lamps in the quartz jacket tubes are arranged in what are known as lamp banks. This arrangement is used for disinfecting UV radiation channels. Channels are unpressurized and uncovered conduits where sewage flows slowly and with approximately the same speed over the cross section. At the same time the water level is kept constant. By uniformly distributing the lamps a zone of uniform space radiation can be created within certain sections in the radiation channel. This almost homogeneous space radiation is essentially determined by the individual power of the lamps, the spacing of the lamps from each other, the flow velocity and the UV transmissivity of the water to be irradiated. The length of such lamps is approximately 1.5 meters and in commercial systems normally a plurality of lamps, in some case over 100 items, are used.

Published patent application DE 199 57 073 A1 discloses, for example, a UV lamp configuration for installation in a radiation channel consisting of frameless lamp modules with overhanging UV lamps with plug connections, wherein the UV lamps are arranged in parallel to the flow direction and via a lifting eye on the configuration column can be pulled upwards and out of the channel. The lamps can also be positioned horizontally and transversely to the flow direction, see U.S. Pat. No. 4,367,410. Finally, there are systems in which the lamps stand or hang vertically in the channel, for example in the U.S. Pat. No. 5,660,719 and U.S. Pat. No. 5,332,388.

A lamp with jacket tube, head section and fastening elements is referred to as a lamp unit. An assembly of several UV lamps forms a module, with multiple modules being referred to as a lamp bank. Modules must be lifted out of the channel for maintenance purpose, for example to change individual lamps or to clean the lamp surface. At the same time modules can be lifted or swung out of the channel manually or mechanically. In the module itself, the lamps are retained by screw connections. These screw connections have the disadvantage that maintenance is time-consuming.

A problem for the invention is to further develop and provide a UV lamp module that allows quick and easy exchange of the UV lamps in the module.

SUMMARY OF THE INVENTION

According to this a UV lamp module has a frame and at least two lamp units, wherein each lamp unit has a UV lamp extending in an axial direction, a jacket tube enclosing the UV lamp, electrical connections and a head section for fastening the lamp unit to the frame, having for each of the lamp units a fastening device by means of which the lamp unit can be separably connected in the region of the head section.

This fastening device preferably has fastening elements with a shaft and a head arranged at the free end of the shaft, wherein the head is enlarged relative to the shaft.

At the same time the shaft is preferably aligned parallel to the axial direction. These fastening elements can for example comprise screws with screw heads and nuts.

For receiving the fastening elements, the frame has openings. In a preferred embodiment these openings are in the form of keyholes.

At the same time the fastening elements can be introduced in the axial direction in the openings and by rotation of the lamp unit about the axial direction can be brought into an operating position, so that the heads of the fastening device are secured in the axial direction in a form-fitting manner in the openings.

In order to ensure the form-fitting securing in the axial direction, a snap-in locking device which secures the head section in the operating position automatically is preferably provided.

In a preferred embodiment this snap-in locking device comprises a plunger pin and an index hole.

At the same time the plunger pin is arranged on the head section and the index hole on the frame.

The plunger pin can, moreover, be moved in the axial direction and spring-loaded in a snap-in position.

To release the head section from the operating position it is provided that the plunger pin can be moved manually in the axial direction against the spring loading out of the index hole.

In the arrangement according to the invention the lamp unit is employed by introducing the jacket tube into an opening of the frame in the axial direction as far as a stop and then locked by rotation about the axial direction until the plunger pin automatically snaps into position in the index hole.

The lamp module according to the invention allows easy and rapid exchange of the lamp units in the module.

BRIEF DESCRIPTION OF THE DRAWINGS

A preferred embodiment of the invention is explained in more detail in the following using the drawings. Identical functional elements bear the same references here. These show as follows.

DETAILED DESCRIPTION OF THE INVENTION

Figure 1:
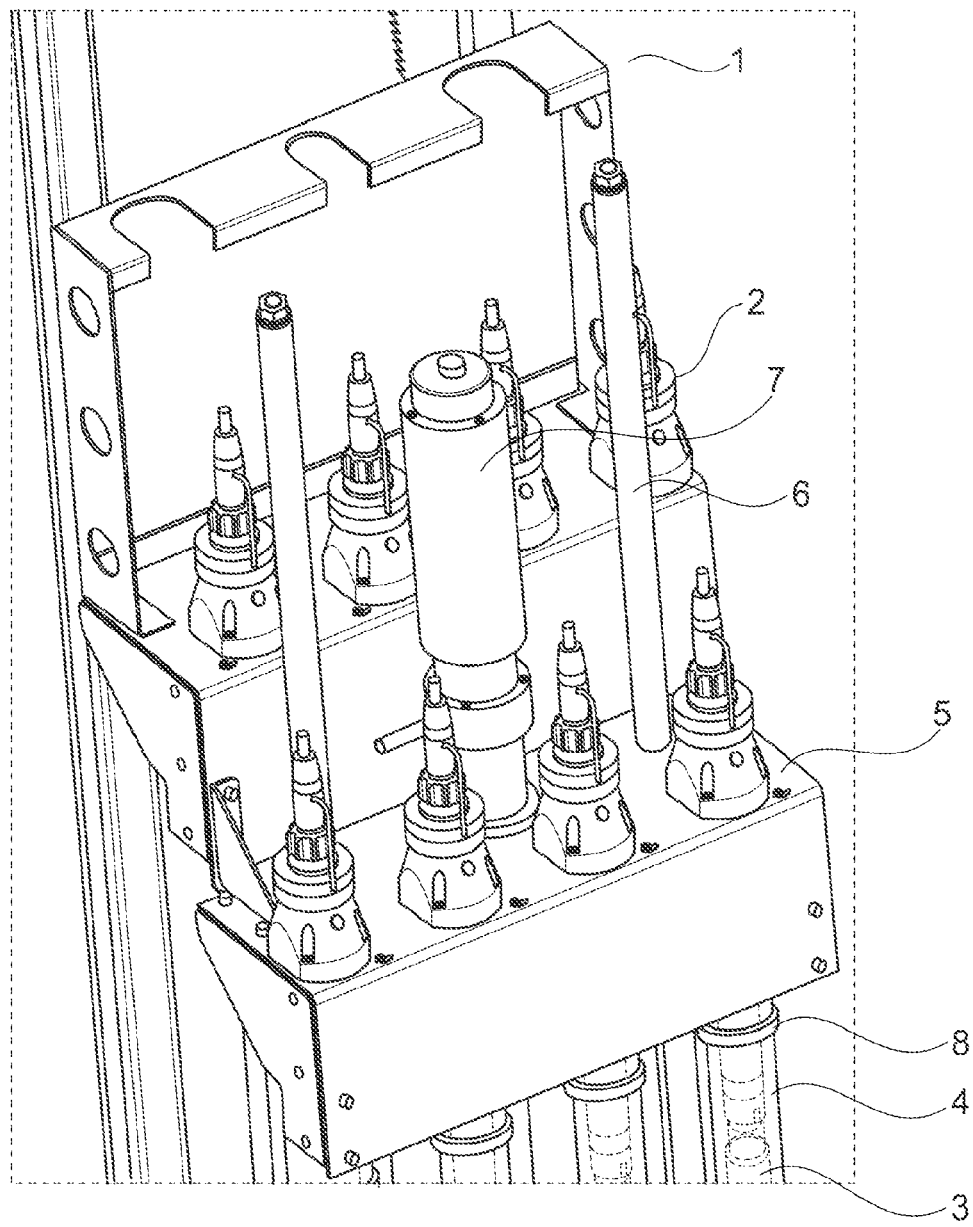
FIG. 1: a perspective view of a lamp module with eight lamp units.

FIG. 1 shows a lamp module 1 with eight parallel lamp units 2 arranged in two rows from a UV water treatment system. A lamp unit 2 comprises essentially radially symmetrical UV lamp 3 the longitudinal extension of which is greater than its radius and which is enclosed by an axially centred and cylindrical jacket tube 4, a head section and fastening elements. The module 1 is intended for installation in a channel, wherein the lamp units 2 are preferably positioned at an angle of 45° to the surface of the water. At the same time the head sections of the lamp units 2 with cable connections protrude by the same distance out of the water. The module 1 has a baseplate (not shown), resting on the base of the channel and supporting the lamp units 2 at their lower end. The module 1 also has an upper frame 5, for receiving the lamp units 2, and longitudinal struts 6, connecting the baseplate and the frame 5. A drive 7 is also provided, which displaces a cleaning device 8, as known from the state of the art, pneumatically or hydraulically in the longitudinal direction of the jacket tube 4.

Figure 2:
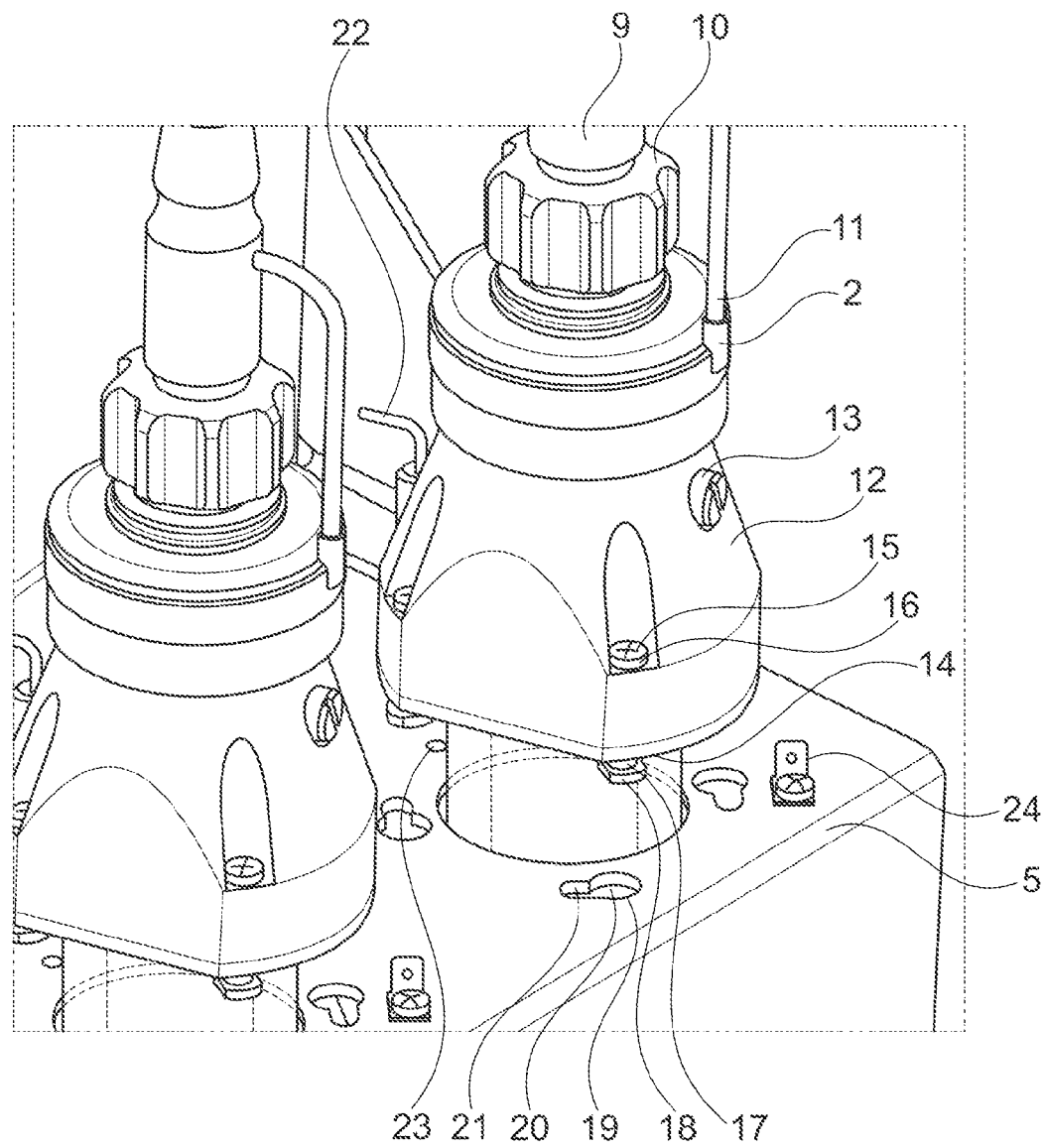
FIG. 2: a perspective view of a lamp head according to the invention.

FIG. 2 shows an enlarged section of FIG. 1 with two lamp units 2 in the not fully assembled state. In the axial direction below the electrical connection 9 with union nut 10 the lamp unit 2 has a further union nut 11, connecting the lamp (not shown here) with a conical headpiece 12. At the same time the conical headpiece 12 is connected indirectly via a stud screw 13 with the lamp, thereby preventing twisting of the lamp in the lamp unit 2. In the axial direction below the headpiece 12 the lamp unit 2 has a circular baseplate 14, which by means of the symmetrically arranged screws 15, comprising screw head 16 and threaded sleeve 17, is secured to the headpiece 12. These axially oriented screws 15 on an end of the threaded sleeve 17 in the region of the lamp also have nuts 18. These nuts 18 are part of a turn lock between the headpiece 12 and the module frame 5. To this end the module frame 5 has corresponding keyhole-shaped cutouts 19 with an opening 20 and a connecting slot 21 of narrow width. In order to prevent twisting of the lamp unit 2 relative to the module 1 a snap-in locking device 22 is provided on the outside of the head section 12 and an index hole 23 in the module frame 5. Furthermore, the frame 5 of the module 1 has a plurality of ground connections 24, wherein one connection 24 is assigned to each lamp unit 2. In the following the individual components of the lamp unit 2 according to the invention are described in more detail.

Figure 3:
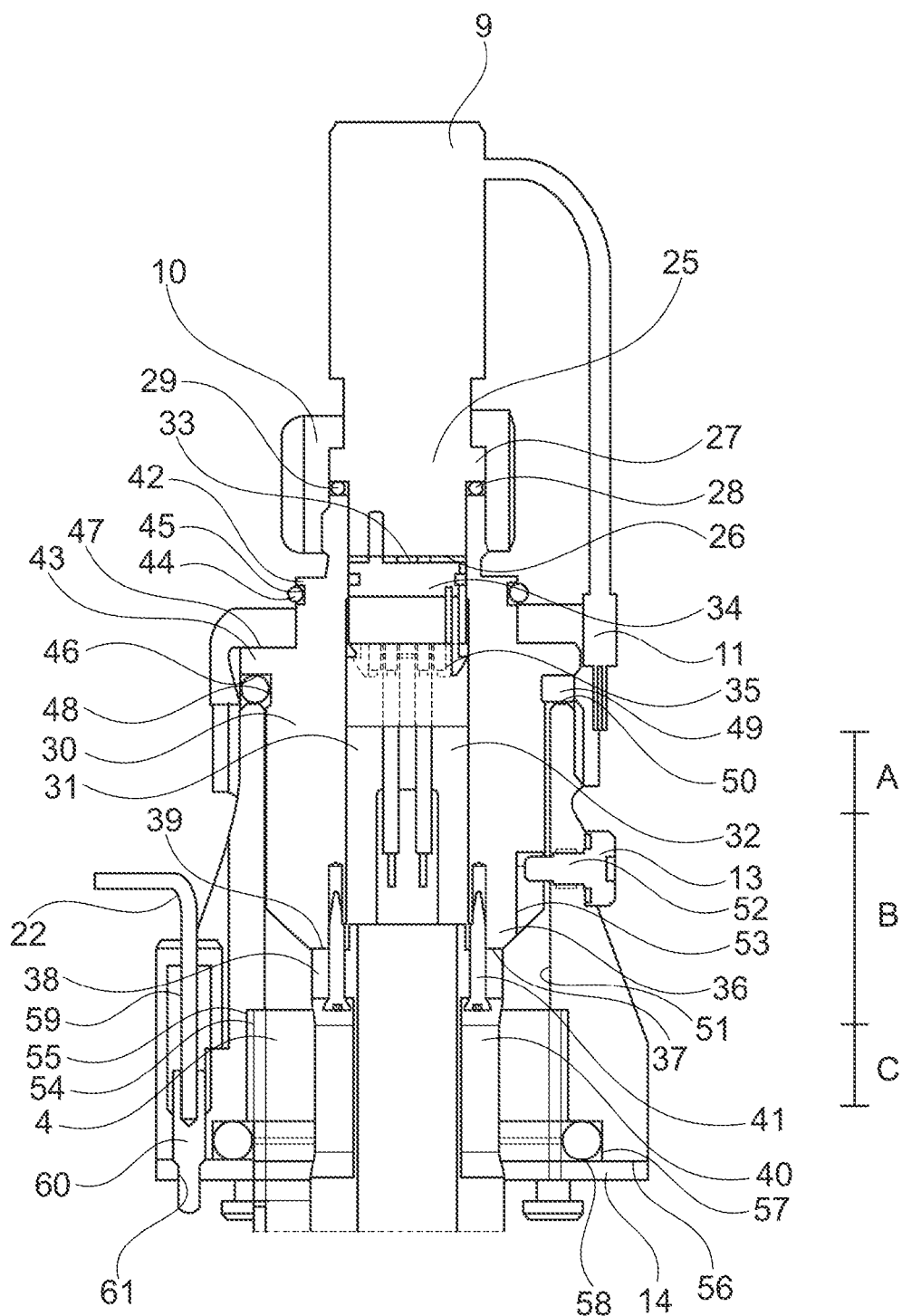
FIG. 3: a longitudinal section through a lamp head according to the invention.

FIG. 3 shows a first embodiment of the lamp module according to the invention. A cylindrical bushing 25 of the electrical connection 9 has a radially symmetrical projection 27 with a shoulder 28 in the region of the lamp, close to its end 26 in the region of the lamp. In the axial direction below this shoulder 28 an O-ring 29 is in contact, to which in turn in the axial direction a rotationally symmetrical plug element 30, having a central opening 31 running through it, is connected. At the same time the bushing 25 received in opening 31 is secured to the plug element 30 by means of the union nut 10, which encloses an upper part of the plug element 30, the O-ring 29 and the projection 27. From below a cylindrical extension adapter 32 connects in the opening 31 with a plug connector 34 at the end 33 remote from the lamp, having a ceramic base 35.

In order that contact between the plug connector 34 and the bushing 25 can be guaranteed, the plug element 30 is screwed at an end 36 in the region of the lamp, on an underside 37 in the region of the lamp to the extension adapter 32. To this end the extension adapter 32 in the axial direction below the plug element 30 has a radial projection 38 with shoulder 39, extending axially as far as the end of the extension adapter 32 and the shoulder 39 of which is in contact with the underside 37, in the region of the lamp, of the plug element 30. In the axial direction just below the projection 38 the extension adapter 32 has in its outer wall two opposing notches 40. These notches 40 extending longitudinally in the axial direction have a dimension corresponding, with a certain amount of play, to the height and width of the fastening screw 41, so that the insertion of the screw 41 in the notch 40 for axial fastening is possible. For screw-fastening the extension adapter 32 has one axial hole per notch 40, which also extends into the plug element 30 from below.

In the axial direction below the first union nut 10 the plug element 30 has a first radially symmetrical protrusion 42, extending as far as a second, narrower, radially symmetrical protrusion 43. At the level of the top half of the first protrusion 42 an external circular groove 44 is provided, having an O-ring 45. The second protrusion 43 forms a radially symmetrical shoulder 46, 47 in the region of the lamp and remote from the lamp. Below the shoulder 46 in the region of the lamp a further circular groove 48 is provided, receiving a further O-ring 49. This O-ring 49 connects upwards to the shoulder 46, in the region of the lamp, of the plug element 30, and downwards to a front side 50, positioned parallel thereto, of the headpiece 12 remote from the lamp.

The headpiece 12, like the plug element 30, has a centred opening 51 running through it, the internal diameter of which corresponds, with a certain amount of play, to the external diameter of the plug element 30 below the second protrusion 41. In the axial direction below the second protrusion 43 the headpiece 12 completely encloses the plug element 30 as far as an end 36, in the region of the lamp, of the plug element 30. In the axial direction thereafter the headpiece 12 overhangs the plug element 30 and encloses an upper part of the extension adapter 32 or of the jacket tube 4.

For joining the plug element 30 with the headpiece 12 the lamp unit 2, in addition to the O-ring 49, has a union nut 11, enclosing an upper cylindrical part A of the headpiece 12, the O-ring 49 and the plug element 30 to beyond the shoulder 47 remote from the lamp. Below the union nut 11 the headpiece 12 tapers off in an area B. After area B the lower part C of the headpiece 12 has a constant radius. In the top half of the area B a lateral, radial threaded hole 52 is provided, that passes through the headpiece 12. As an extension to the radial threaded hole 52 the plug element 30 has a longitudinal recess 53 in the outer surface, extending as far as the end 36, remote from the lamp, of the plug element 30. A stud screw 13 passes through threaded hole 52 and the recess 53 in order to prevent the twisting of the lamp in relation to the headpiece 12.

The opening 51 of the headpiece 12 in the bottom half of the tapered area A also has a relief 54. This relief 54 forms a radially symmetrical shoulder in the region of the lamp 55, to which the jacket tube 4 joins from below. At the same time the jacket tube 4 has an external radius, which is significantly greater than the external radius of the enclosing extension adapter 32 in the upper part. To secure the rotationally symmetrical jacket tube 4, on a front side 56, in the region of the lamp, of the headpiece 12, on the interior, a circular recess 57 is provided, which in combination with the baseplate 14, forms a circular groove for receiving an internal sealing O-ring 58.

In order to secure the turn-lock against rotation, on the outside of the headpiece 12 the snap-in locking device 22 is provided. This snap-in locking device 22 has a helical spring 59 and a plunger pin 60 pre-tensioned by the helical spring 59, which in the unlocked state shown protrudes through a hole 61 in the baseplate 14 and clearly sticks out.

Figure 4:
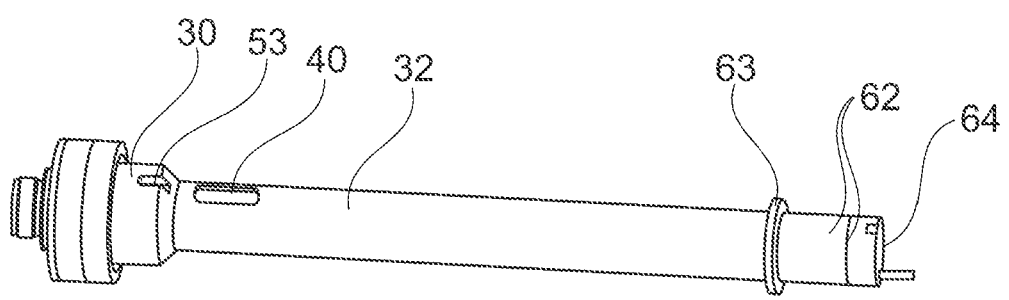
FIG. 4: a perspective view of the lamp from FIGS. 2 and 3 with fastening elements.
Figure 5:
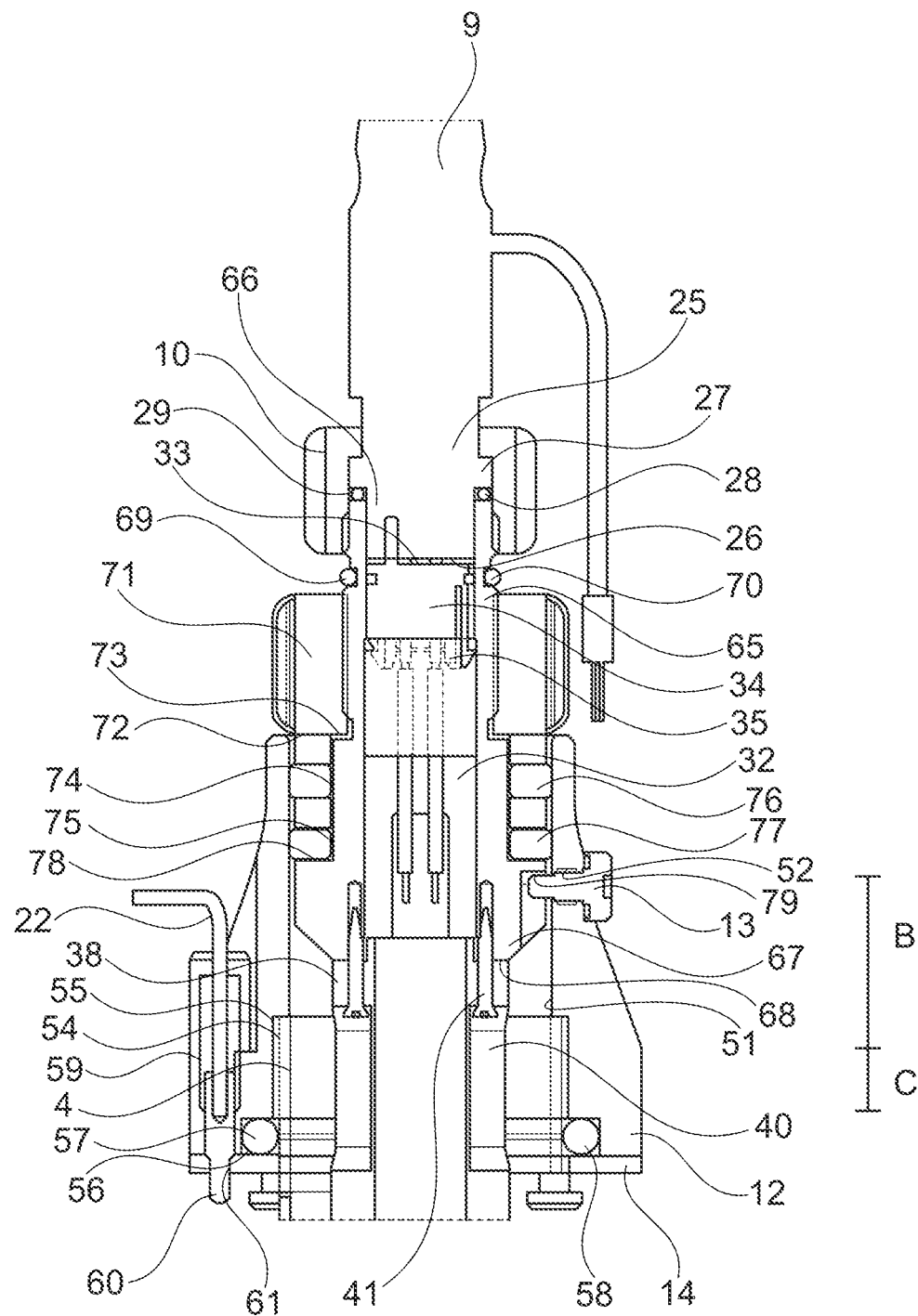
FIG. 5: a longitudinal section through a lamp head according to the invention.

FIG. 4 shows the three-dimensional view of the lamp unit according to the invention from FIG. 3 without electrical connection and headpiece. Clearly visible are the recess 53 of the plug element 30 and the recess 40 of the extension adapter 32. Furthermore, before the end 62, in the region of the lamp, a centring ring 63 is shown, that centres the extension adapter 32 in relation to the jacket tube (not shown here). A connection 64 for a UV lamp is located at the end 62, in the region of the lamp, of the extension adapter 32. Here it should be noted that the length of the extension adapter can be modified to suit the desired module design FIG. 5 shows a second embodiment according to the invention. As shown in the first embodiment, the cylindrical bushing 25 of the electrical connection 9 close to its end 26, in the region of the lamp, has the radially symmetrical protrusion 27 with the shoulder 28, in the region of the lamp. The O-ring 29 is brought into contact in the axial direction below this shoulder 28, to which in turn in the axial direction a rotationally symmetrical plug element 65, having a central opening 66 through it, is connected. At the same time the bushing 25 received in the opening 66 is secured to the plug element 65 by means of the union nut 10, enclosing an upper part of the plug element 65, the O-ring 29 and the protrusion 27. In the opening 66 the cylindrical extension adapter 32 connects from below with the plug connector 34, having a ceramic base 35 and located at the end 33, remote from the lamp.

As explained in the previous embodiment, the plug element 65 is screwed at an end 67, in the region of the lamp, on an underside 68, in the region of the lamp, to the extension adapter 32. To this end the extension adapter 32, in the axial direction below the plug element 65, has a radial protrusion 38 with shoulder 39, extending axially as far as the end of the extension adapter 32 and the shoulder 39 of which is in contact with the underside 68, in the region of the lamp, of the plug element 65. In the axial direction just below the protrusion 38 the extension adapter 32 in its outer wall has two opposing notches 40. These longitudinal notches 40 in the axial direction have a dimension corresponding, with a certain amount of play, to the height and width of the fastening screw 41, so that the insertion of the screw 41 in the notch 40 for axial fastening is possible. For screw-fastening the extension adapter 32 has one axial hole per notch 40, which also extends into the plug element 30 from below.

In the axial direction below the first union nut 10 the plug element 65 has an external circular groove 69, for receiving an O-ring 70. In the axial direction below this a further union nut 71 is provided. At the same time the union nut 71 is arranged with its front side 72, in the region of the lamp, in contact with a first relief 73 of the plug element 65. This first relief 73 has a larger radius than the upper part of the plug element 65 and in combination with an insert two radially symmetrically spaced grooves 74, 75, in which respectively an O-ring 76, 77 is positioned. In the axial direction a second relief 78 follows with a larger radius again is in contact with the lower O-ring 77. At the same time the plug element 65, starting from the first relief 73 is radially enclosed by the headpiece 12, wherein the internal diameter of the headpiece 12, with a certain amount of play, corresponds to the external diameter of the plug element 65 after the second relief 78. The O-rings 76, 77 thus form a radial-static seal between the plug element 65 and the headpiece 12.

Following on in the axial direction the headpiece 12 overhangs the plug element 65 and encloses an upper part of the extension adapter 32 or the jacket tube 4.

Below the union nut 71 the headpiece 12 tapers off in the area B. After area B the lower part C of the headpiece 12 has a constant radius. In the top half of area B the lateral, radial threaded hole 52 is provided, through the headpiece 12. As an extension to the radial threaded hole 52 the plug element 65 has a longitudinal recess 79 in the external surface, extending as far as the end 67, in the region of the lamp, of the plug element 65. The stud screw 13 passes through the threaded hole 52 and the recess 79 in order to prevent the twisting of the lamp in relation to the headpiece.

As with the previous embodiment, the opening 51 of the headpiece 12 in the bottom half of the tapered area B also has the relief 54. This relief 54 forms the radially symmetrical shoulder 55 in the region of the lamp, to which the jacket tube 4 connects from below. At the same time the jacket tube 4 has an external diameter which is considerably greater than the external radius of the enclosing extension adapter 32 in the upper part. To secure the rotationally symmetrical jacket tube 4 on a front side 56, in the region of the lamp, of the headpiece 12, on the interior, the circular recess 57 is provided, which in combination with the baseplate 14, forms a circular groove for receiving an internal sealing O-ring 58.

In order to secure the turn-lock against rotation on the outside of the headpiece 12 the snap-in locking device 22 is provided. This snap-in locking device 22 has the helical spring 59 and the plunger pin 60 pre-tensioned by the helical spring 59, which in the unlocked state shown protrudes through the hole 61 in the baseplate 14 and clearly sticks out.

Figure 6:
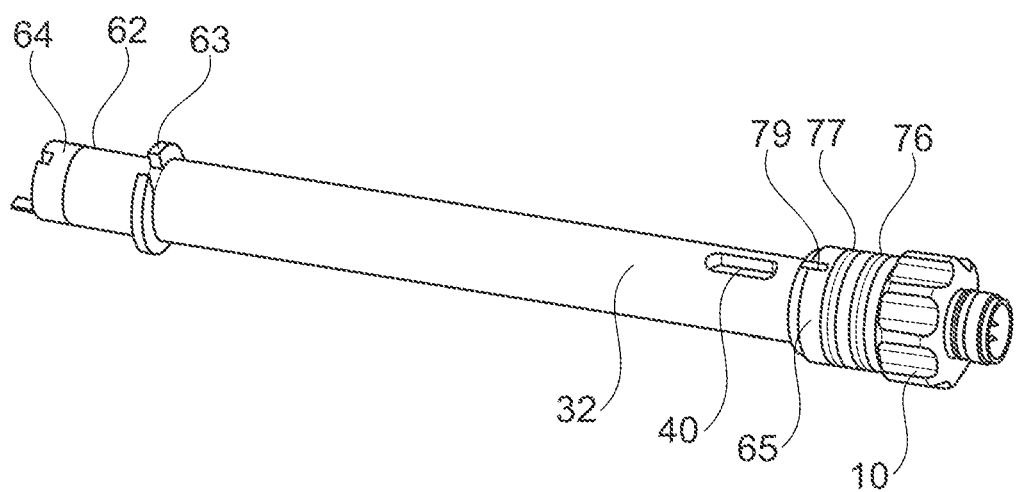
FIG. 6: a perspective view of the lamp head according to the invention from FIG. 5.

FIG. 6 shows the three-dimensional view of the lamp unit according to the invention from FIG. 5 without electrical connection and headpiece. Clearly visible in the upper part are the O-rings 76, 77 arranged in axial direction below the union nut 10, the recess 79 of the plug element 65 and the recess 40 of the extension adapter 32. Furthermore, before the end 62, in the region of the lamp, the centring ring 63 is shown, that centres the extension adapter 32 in relation to the jacket tube (not shown here). The connection 64 for a UV lamp is located at the end 62, in the region of the lamp, of the extension adapter 32. Here it should be noted that the length of the extension adapter can be modified to suit the desired module design.

Figure 7:
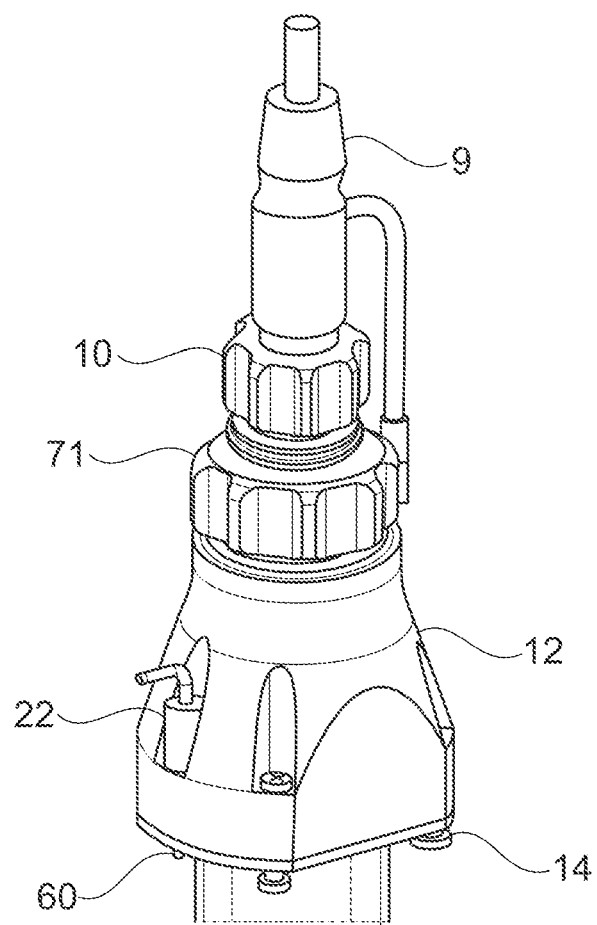
FIG. 7: a perspective view of the lamp jacket tube from FIGS. 5 and 6 with fastening elements.

FIG. 7 shows the three-dimensional representation of the embodiment according to the invention from FIG. 5. In the axial direction below the electrical connection 9 the first and second union nuts 10, 71 are shown. Below this the tapered headpiece 12 connects with the screwed baseplate 14. The snap-in locking device 22 with the plunger pin 60 is also shown.

The UV lamp modules according to the invention have lamp units 2, which by means of the turn-lock are simple and quick to fit or remove. To close the turn-lock the headpiece 12 and the module frame 5 are brought together with their ends parallel, so that the undercuts of the nuts 18 engage below the openings 20 and by twisting the two elements towards each other, in the plane, the threaded sleeves 17 of the screws 15 achieve locking in the axial direction in the slotted area 21 of the opening. Furthermore, the turn-lock is secured against twisting with the snap-in locking device 22. To this end the spring-loaded plunger pin 60 of the snap-in locking device 22 is placed under upward tension as the headpiece 12 and the module frame 5 are brought together, so that as the turn-lock locks the plunger pin 60 latches into the index hole 23 of the module frame 5. Through the arrangement of the O-rings 29, 45, 49, 58, 70, 76, 77 a radial-static seal of the jacket tube 4 is also achieved.

Figure 8:
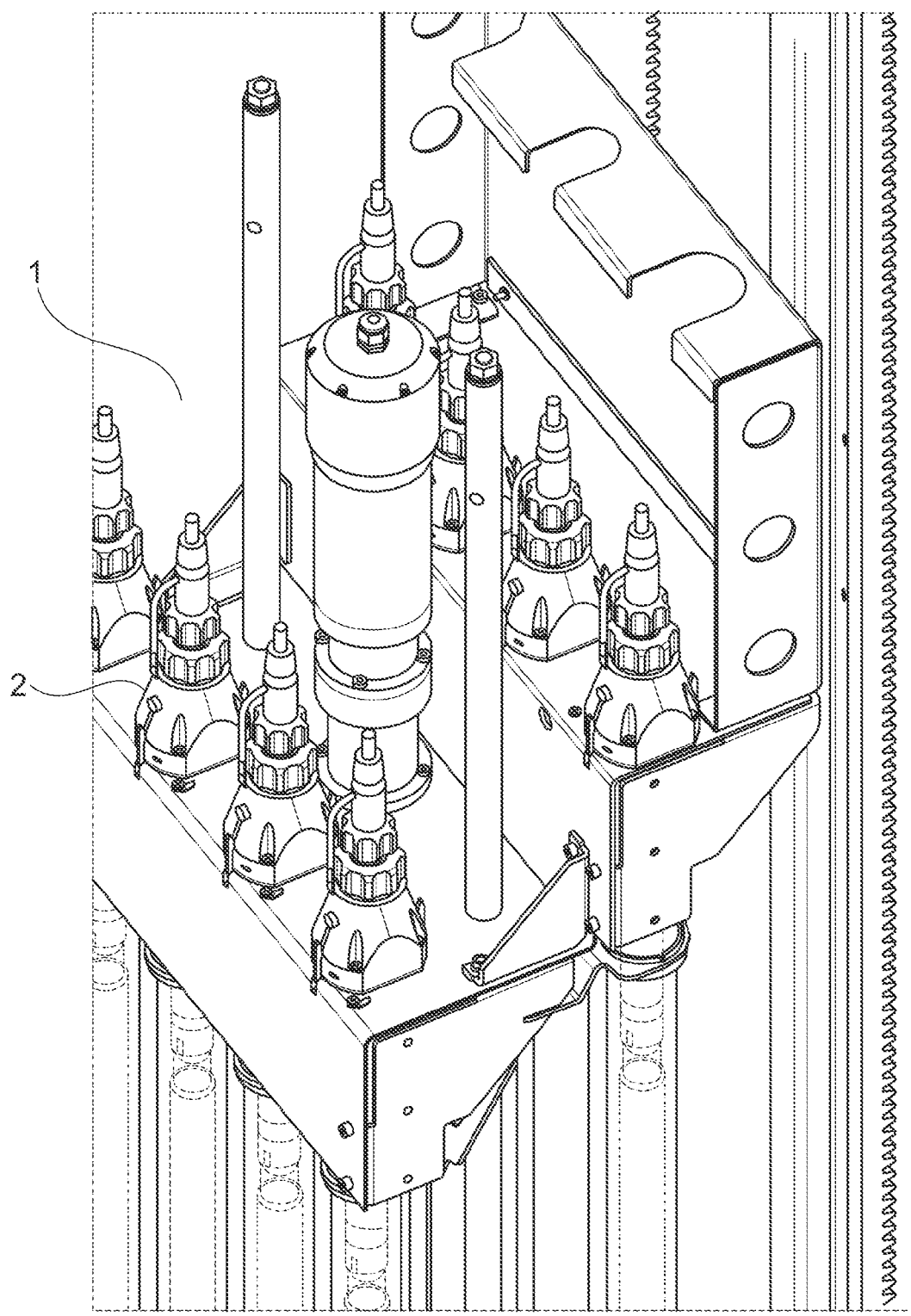
FIG. 8 a perspective view a further lamp module according to the invention with eight lamp units.

FIG. 8 shows a further embodiment of the lamp module according to the invention 1. As in FIG. 1 a lamp module 1 with eight parallel lamp units 2 arranged in two rows from a UV water treatment system can be seen, wherein the lamp units 2 are preferably positioned at an angle of 45° to the surface of the water. The head sections of the lamp units 2 correspond essentially to those of FIG. 5 apart from the fastening device and the snap-in locking device.

A snap-in locking device is not provided. The fastening device shown is described in detail using the following figures.

Figure 9:
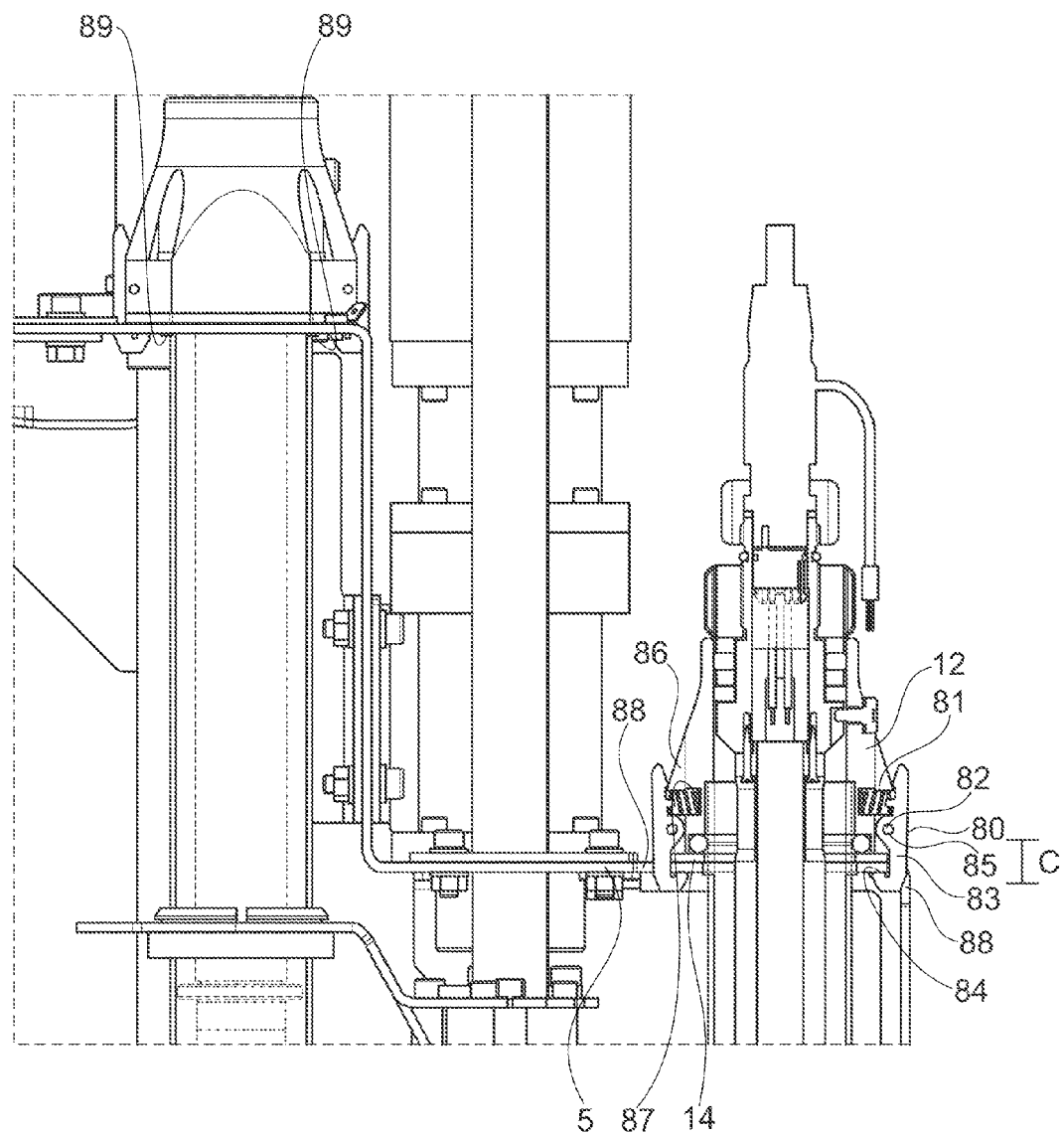
FIG. 9 a longitudinal section through the lamp module from FIG. 8.

FIG. 9 shows a longitudinal section through the lamp module 1 from FIG. 8. The construction of the head section essentially corresponds to that from FIG. 5 except for the fastening device and the snap-in locking device which is not present. The fastening device has two fastening elements 80 each with a spring element 81, a pin 82 and a hook 83 with an undercut 84 and an opening 85. For securing the fastening elements 80 to the head section the headpiece 12 has two opposing recesses 86 in section C, extending over the full height of section C. On the end of the recesses 86 remote from the lamp the recesses 86 in each case in the form of a cylindrical cutout 87 continue radially inwards. These cylindrical cutouts 87 in each case receive the spring element 81, with which in each case the hook 83 is pre-tensioned. For mounting the hook 83 in the headpiece 12 the opening 85 of the hook 83 is arranged transversally to the hook 83, so that the pin 82 can penetrate both the opening 85 and also a continuation opening of the headpiece 12 on the respective end. The pin 82 thus serves as the mounting for the hook in the headpiece 12 and forms an axis of rotation for the hook 83. The spring element 81, which is received on one side by the cutout 87 of the headpiece 12 and at the other end is connected to the upper part of the hook 83, pre-tensions the hook 83 at the upper end remote from the lamp tangentially outwards. The undercut 84 of the hook 83, pointing inwards, is thus pre-tensioned tangentially inwards. To secure the fastening elements 80 with the frame 5 two opposing slotted openings 88 are provided in the frame 5, wherein the openings 88 extend radially away from the headpiece 12. At the same time, the length of the openings 88 is greater than the depth of the hook 83 at the level of the undercut 84.

In the locked state shown here the hooks 83 engage in each case though the opening 88 in the frame 5, wherein the undercut 84 engages below the frame 5 and this state is maintained by the spring element 81 with pre-tensioning. In addition to the fastening device four pins 89 are provided, which pass axially through the headpiece 12 into the external section. At the same time the pins are offset at 45° to the fastening elements 80 each with a 90° spacing between one another. At the same time the pins 89 protrude beyond the baseplate 14. For securing, as a counterpart to the pins 89 four index holes (not shown) are provided in the frame 5, which in each case receive a pin 89. It is intended that screws are used as pins.

By means of the pins and the slotted openings 88, apart from axial securing, rotation and translation of the lamp unit 2 in relation to the frame 5 is prevented. For releasing and securing the lamp unit 2 the upper ends, remote from the lamp, of the hooks 83 are pushed together against the spring force of the spring element 81, so that the undercuts 84 of the hooks 83 move in the radial direction outwards to the opening 88 and the lamp unit 2 is released in the axial direction.

Figure 10:
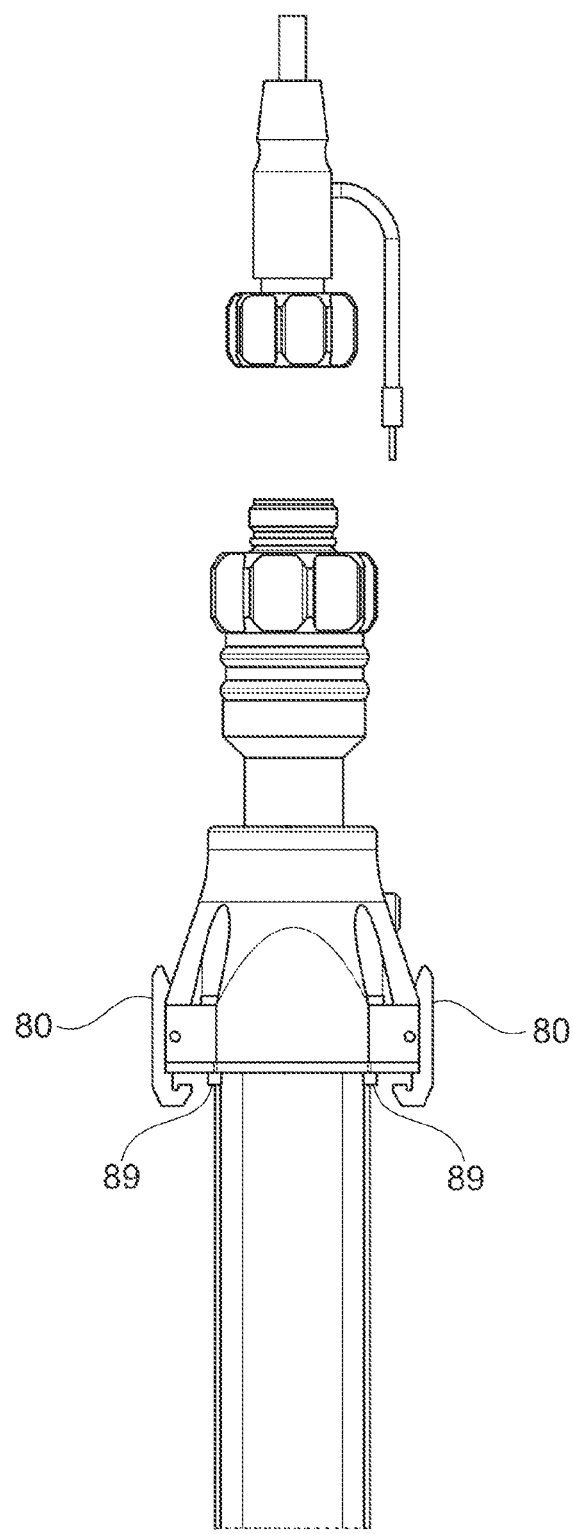
FIG. 10 a perspective view of the lamp unit from FIGS. 8 and 9.

FIG. 10 shows the lamp unit 2 from FIGS. 8 and 9 in a three-dimensional representation. Easily recognisable are the fastening elements 80 and the pins 89, the combination of which guarantees a secure and rapidly separable fastening of the lamp unit 2 in the lamp module 1.

REFERENCE NUMBER

1. Lamp module
2. Lamp unit
3. UV lamp
4. Jacket tube
5. Frame
6. Longitudinal strut
7. Drive
8. Cleaning device
9. Electrical connection
10. Union nut
11. Union nut
12. Headpiece
13. Stud screw
14. Baseplate
15. Screws
16. Screw head
17. Threaded sleeve
18. Nut
19. Cutout
20. Opening
21. Slot
22. Snap-in locking device 23. Index hole
24. Ground connections
25. Sleeve
26. End of sleeve in the region of the lamp
27. Protrusion
28. Shoulder in the region of the lamp
29. O-ring
30. Plug element
31. Opening
32. Extension adapter
33. End, remote from the lamp, of the extension adapter
34. Plug connector
35. Ceramic base
36. End, in the region of the lamp, of the plug element
37. Underside, in the region of the lap, of the plug element
38. Protrusion
39. Shoulder
40. Notches
41. Fastening screw
42. Protrusion
43. Protrusion
44. Groove
45. O-ring
46. Shoulder, in the region of the lamp, of the second protrusion
47. Shoulder, remote from the lamp, of the second protrusion
48. Groove
49. O-ring
50. Front side, remote from the lamp, of the headpiece
51. Opening
52. Threaded hole
53. Recess
54. Relief
55. Shoulder, in the region of the lamp, of the relief
56. Front side, in the region of the lamp, of the headpiece
57. Recess
58. O-rings
59. Helical spring
60. Plunger pin
61. Hole
62. End, in the region of the lamp, of the extension adapter
63. Centring ring
64. Connection
65. Plug element
66. Opening
67. End, in the region of the lamp, of the plug element
68. Underside, in the region of the lamp, of the plug element
69. Groove
70. O-ring
71. Union nut
72. Front side, in the region of the lamp, of the union nut
73. Plug element relief
74. Groove
75. Groove
76. O-ring
77. O-ring
78. Second plug element relief
79. Recess
80. Fastening element
81. Spring element
82. Pin
83. Hook
84. Undercut
85. Opening
86. Recess
87. Cutout
88. Opening in frame
89. Pin

The invention claimed is:

1. An ultraviolet (UV) lamp module having a frame and at least two lamp units, wherein each lamp unit comprises a UV lamp extending in an axial direction, a jacket tube enclosing the UV lamp, electrical connections, a head section for fastening the lamp unit to the frame, and a fastening device mounted to one of the frame and the lamp unit, each fastening device configured for separably connecting one of the lamp units to the frame in the region of the head section, the other of the frame and the lamp unit having openings for receiving the fastening devices, each fastening device having a hook for engaging one of the openings, the hook rotatably mounted about an axis of rotation parallel to the frame and spring-loaded in a snap-in position.

2. The UV lamp module according to claim 1, further comprising a device for securing the head section in an operating position.

3. The UV lamp module according to claim 1, wherein the openings have a slotted design.

4. The UV lamp module according to claim 1, wherein the device comprises at least one pin and one index hole.

5. The UV lamp module according to claim 1, wherein the hook is configured to be pressed against the spring force while introducing the jacket tube into an opening of the frame and rotating the jacket tube in the axial direction as far as a stop, and then releasing the spring force pressure on the hook.

6. An ultraviolet (UV) lamp module having a frame and at least two lamp units, each lamp unit comprising a UV lamp extending in an axial direction, a jacket tube enclosing the UV lamp, electrical connections, a head section for fastening the lamp unit to the frame, and a plurality of fastening devices mounted to one of the frame and the lamp unit, each fastening device configured for separably connecting one of the lamp units to the frame in the region of the head section, each fastening device comprising a fastening element with a shaft and a head arranged on a free end of the shaft, wherein the head is enlarged in relation to the shaft, and the other of the frame and the lamp unit having openings for receiving the fastening devices.

7. The UV lamp module according to claim 6, wherein the shaft is aligned parallel to the axial direction.

8. The UV lamp module according to claim 6, wherein the openings are in the form of keyholes.

9. The UV lamp module according to claim 6, wherein the fastening elements are configured to be introduced in the axial direction in the openings and, by rotating the lamp unit about the axial direction, is configured to be brought into an operating position, in which the heads of the fastening device are secured in a form-fitting manner in the axial direction in the openings.

10. The UV lamp module according to claim 6, further comprising a snap-in locking device that automatically secures the head section in the operating position.

11. The UV lamp module according to claim 10, wherein the snap-in locking device comprises a plunger pin and an index hole.

12. The UV lamp module according to claim 11, wherein the plunger pin is arranged on the head section and the index hole is arranged on the frame.

13. An ultraviolet (UV) lamp module having a frame and at least two lamp units,
wherein each lamp unit comprises a UV lamp extending in an axial direction, a jacket tube enclosing the UV lamp, electrical connections, a head section for fastening the lamp unit to the frame, and a fastening device for each lamp unit, each fastening device configured for separably connecting one of the lamp units to the frame in the region of the head section, and a snap-in locking device that automatically secures the head section in the operating position, the snap-in locking device comprising a plunger pin arranged on the head section and an index hole arranged on the frame, the plunger pin movable in the axial direction and spring-loaded in a snap-in position.

14. The UV lamp module according to claim 13, wherein, to release the head section from the operating position, the plunger pin is configured to be moved manually in the axial direction against the spring-loading out of the index hole.

15. The UV lamp module according to claim 13, wherein the jacket tube is configured to be introduced into an opening of the frame in the axial direction as far as a stop and then through a rotation about the axial direction until the plunger pin automatically snaps into the index hole.

16. An ultraviolet (UV) lamp module comprising:

a frame having a plurality of cutouts, each cutout defining an opening and a slot extending from the opening, the slot having a smaller diameter than the opening; and at least one lamp unit that is releasably connected to the frame, the lamp unit including a UV lamp extending in an axial direction, a jacket tube enclosing the UV lamp, and fastening devices for releasably connecting the lamp unit to the frame, each fastening device including a shaft and an enlarged head arranged on a free end of the shaft for engaging one of the cutouts in the frame, wherein, for each fastening device, the lamp unit is configured to be attached to the frame by first introducing the enlarged head in the axial direction into the opening of the cutout, and then rotating the lamp unit about the axial direction to secure the shaft in the slot extending from the opening in a form-fitting manner.

* * * * *